Jan. 7, 1969  R. V. WEIGEL  3,420,646
LAMP BRIDGE MAKING METHOD AND APPARATUS
Filed May 6, 1965  Sheet 1 of 3
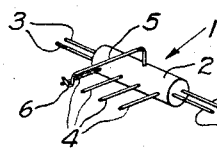
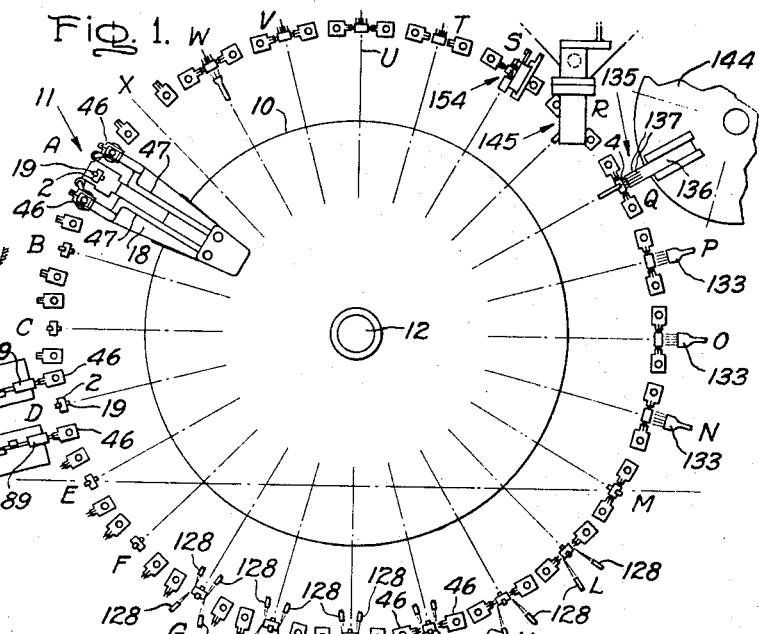
Inventor:
Russell V. Weigel
by James J. Lazna
His Attorney

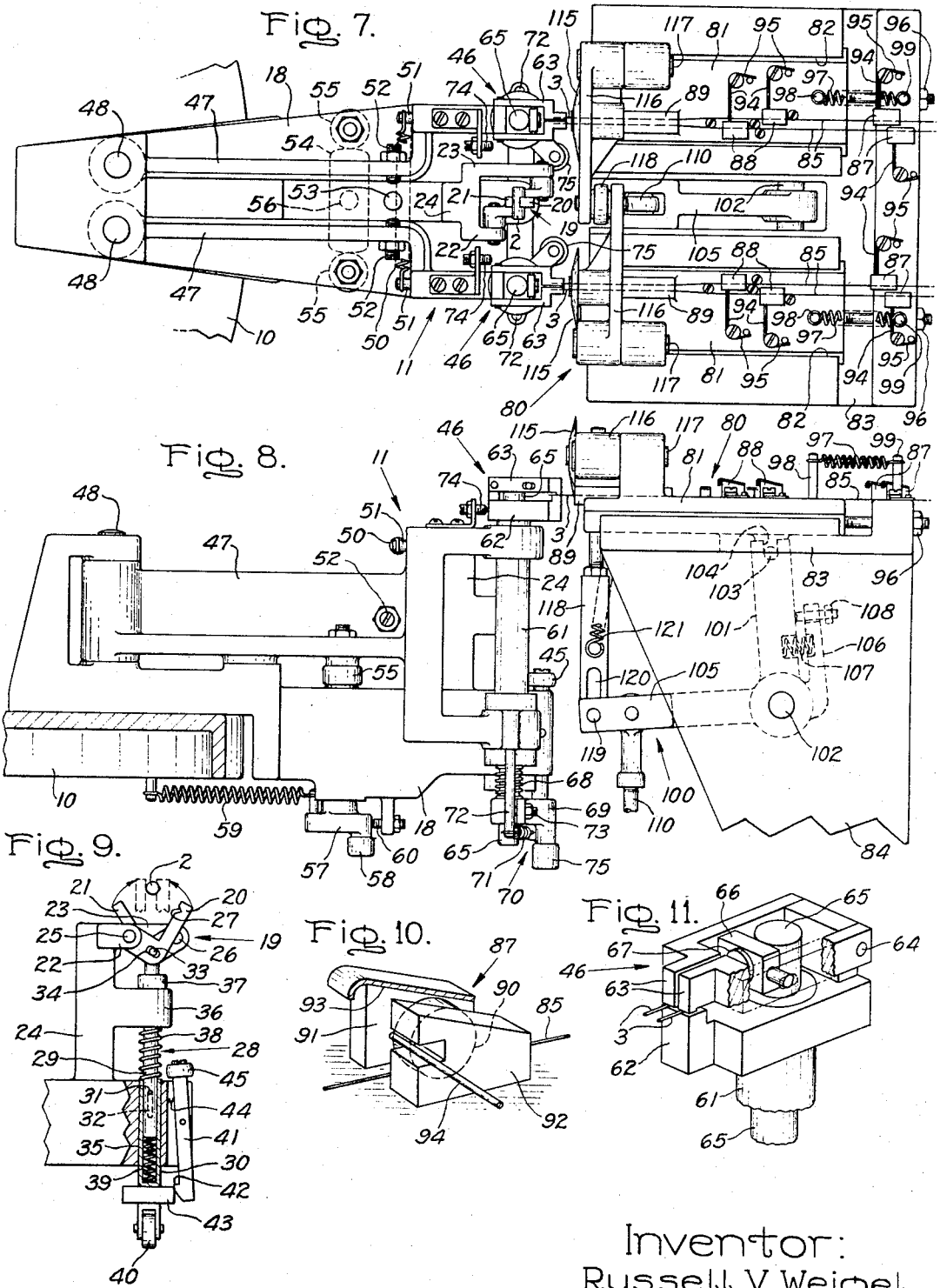

Jan. 7, 1969  R. V. WEIGEL  3,420,646
LAMP BRIDGE MAKING METHOD AND APPARATUS
Filed May 6, 1965  Sheet 3 of 3

Inventor:
Russell V. Weigel
by James J. Lazna
His Attorney

United States Patent Office 3,420,646
Patented Jan. 7, 1969

3,420,646
LAMP BRIDGE MAKING METHOD AND APPARATUS
Russell V. Weigel, Mentor, Ohio, assignor to General Electric Company, a corporation of New York
Filed May 6, 1965, Ser. No. 453,637
U.S. Cl. 65—59                                    15 Claims
Int. Cl. C03c 27/02

ABSTRACT OF THE DISCLOSURE

In a method and apparatus for making insulating bridges for supporting the internal elements of electric lamps and similar devices, a short glass rod is supported intermediate its ends in a pair of holder jaws, short spud wires held in movable holders mounted opposite the ends of the glass rod are inserted endwise into the heated and softened ends of the glass rod by movement of the holders toward the rod ends, the holder jaws for the glass rod then opened and the glass rod thereafter supported solely by the inserted spud wires held in the holders, and a side region of the glass rod then heated and softened and one or more support wires inserted thereinto.

---

This invention relates in general to the manufacture of so-called insulating bridges such as are employed in electric lamps, electronic tubes and similar devices for supporting internal elements such as filaments, and which comprise a short length of glass rod or cane having one or more spud wires embedded in and projecting endwise from each of its ends and one or more support wires embedded in the side of the glass rod and projecting laterally therefrom.

Insulating bridges similar to that referred to above but having spud wires extending from only one of the ends of the glass rod have been manufactured heretofore by automatic apparatus. So far as known, however, no such automatically operating apparatus has been developed heretofore for the manufacture of insulating bridges of the particular type referred to above having one or more spud wires embedded in and projecting endwise from each respective end of the glass rod, the spud wires in such case being customarily inserted heretofore by a hand controlled operation. In addition, such prior bridge making machines have generally been of limited capability in respect to their adaptability to the manufacture of various types of such bridge members having, for example, different lengths and sizes of glass rod and different numbers, sizes and positioning of the side support wires in the glass rod.

It is an object of the invention, therefore, to provide automatically operating apparatus for the manufacture of insulating bridges of the above-mentioned character at a rapid rate and in an economical manner.

Another object of the invention is to provide automatically operating apparatus for the manufacture of a wide variety of such type bridge members having different sizes and lengths of glass rod and different numbers, sizes and positioning of the side support wires thereof.

Still another object of the invention is to provide a novel form of work-supporting head for the manufacture of such type insulating bridges.

A further object of the invention is to provide a novel method of making insulating bridges of the above-mentioned character.

Briefly stated, in accordance with one aspect of the invention, insulating bridges of the type referred to are made from precut short lengths of glass rod which are gripped and supported at regions intermediate their ends in the work-supporting heads of the apparatus and their opposite ends then heated and softened and the spud wires inserted endwise thereinto, following which the support of the glass rod at its intermediate region is released to completely expose the entire length of the glass rod and the assembly of the glass rod and inserted spud wires thereafter supported instead solely by the spud wires, whereupon the side regions of the glass rods are then heated and softened and the side support wires inserted thereinto.

In accordance with a further aspect of the invention, the work-supporting heads of the bridge making apparatus are each comprised of a chuck for gripping and supporting a short length of glass rod at a region intermediate its ends, and a pair of rotatable spud wire holders disposed on opposite sides of the chuck opposite the ends of the glass rod held therein and each adapted to support one or more spud wires at one end with their other end projecting free, the holders being rotatably mounted on the head for rotation between a spud wire loading position wherein the spud wires extend transversely to the glass rod carried in the chuck and a spud wire inserting position wherein the spud wires are approximately aligned lengthwise with the glass rod with their projecting free ends facing toward the opposite ends thereof, the holders also being bodily movable on the head toward and away from each other so as to insert the projecting free ends of the spud wires into the heated and softened ends of the glass rod when the holders are moved toward one another to their advanced position. The work-supporting heads may be mounted on a carrier adapted to index them in step-by-step fashion to a series of successive work stations, and they are each provided with separate actuating mechanisms for controlling the opening and closing of the chuck, the rotative position of the spud wire holders, and the bodily movement of the holders toward and away from each other, the several actuating mechanisms being engaged and actuated by respective operating mechanisms located along the path of travel of the heads.

In accordance with a still further aspect of the invention, spud wire feeding means and a support wire inserting means are provided at certain of the work stations of the apparatus for automatically feeding the spud wires into the holders of each work-supporting head and for inserting the support wires into the softened sides of the glass rods, and suitable heating means are located along the path of travel of the heads for first heating and softening the opposite ends of the glass to permit insertion of the spud wires thereinto, and then heating and softening an intermediate side region of the glass rod to permit insertion of the side support wires thereinto.

Further objects and advantages of the invention will appear from the following detailed description of a species thereof and from the accompanying drawings in which:

FIG. 1 is a plan view, partly diagrammatic, of an automatic bridge making machine comprising the invention;

FIG. 2 is a perspective view of a representative form of insulating bridge member manufactured by the method and apparatus comprising the invention;

FIGS. 3 and 3a are plan and elevation views, respectively, of the glass rod carrying chuck and spud wire carrying holders of each of the work-supporting heads of the apparatus, with the holders shown in their spud wire loading position;

FIGS. 4 and 4a are plan and elevation views corresponding to FIGS. 3 and 3a but showing the spud wire holders rotated into their wire-inserting position;

FIG. 5 is a side elevation of the spud wire holders of one of the work-supporting heads of the apparatus and showing the manner in which the glass rod is supported therein for insertion of the support wires into the side of the glass rod at one of the work stations of the apparatus by the support wire inserting means thereof;

Figure 12:
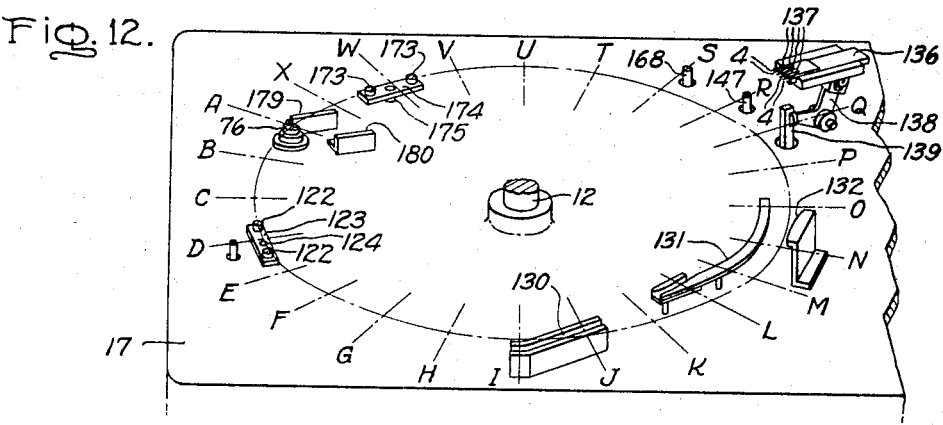

scribed, to thereby pivot the latch out from under the collar 43 of the actuating rod 28 so as to permit the compression coil spring 38 to reurn the actuating rod to its lowered inoperative position to thereby open the jaws 20, 21.

Each of the heads 11 is also provided with a pair of rotatable wire-supporting holders 46 disposed on opposite sides of the associated chuck 19, in positions opposite the ends of the glass rod 2 held therein, and adapted to grip and support one or more (two in the particular case illustrated) short lengths 3 of straight spud wire. The wire holders 46 are carried at the outer ends of respective horizontal swing arms 47 which extend generally radially of the turret 10 and are pivotally mounted at their inner ends on the support bracket 18, on vertical pivot pins 48 thereon, so as to swing horizontally toward and away from each other to bodily displace the wire holders 46 toward and away from the associated chuck 19, between retracted and advanced positions as shown in solid and dash-dot lines, respectively, in FIGS. 4 and 4a. Each head 1 is provided with holder displacing means for pivoting the swing arms 47 so as to effect the bodily displacement of the wire holders 46 thereon toward and away from each other. The said holder displacing means comprises a tension coil spring 50 which is connected across the swing arms 47, between respective spring posts 51 thereon, to normally urge the swing arms and associated wire holders 46 toward one another and hold them in their said advanced position, as determined by the engagement of respective stop pins 52 on the swing arms with a co-operating stop post 53 on the support bracket 18. The bodily movement of the wire holders 46 to their said advanced position by the action of the spring 50 acts to insert the projecting free ends of the spud wires 3 carried by the holders 46 into the softened opposite ends of the glass rod 2 carried in the chuck 19. The holder displacing means additionally comprises a plate-type wedge cam 54 (FIG. 7) which is rotatably mounted on the support bracket 18 in position to wedge beteween cam follower rollers 55 on the respective swing arms 47 so as to force the latter apart and pivot them to their retracted position, against the opposing force of spring 50, when the cam is rotated to position its high or wide portion between the rollers, as shown in FIG. 7. The wedge cam 54 is fastened to the upper end of a vertical shaft 56 which is rotatably mounted on the support bracket 18 and is provided at its depending lower end with an operating arm 57 carrying a roller 58 at its outer end for engagement with a cam track of the apparatus, as hereinafter described. The wedge cam 54 is normally held in its operative wedging position as shown in FIG. 7, with its high portion wedged between the rollers 55 on the spring arms 47, by the pull of a tension coil spring 59 connected at one end to the turret 10 and at its other end to the operating arm 57 on the cam pivot shaft 56. The operative or wedging position of the cam 54 is determined by the engagement of the operating arm 57 on the cam pivot shaft 56 with a cooperating stop pin 60 (FIG. 8) on the support bracket 18.

The wire holders 46 are rotatably mounted on the outer ends of the swing arms 47 to rotate about respective vertical axes. To this end, the holders 46 are fastened on the upper ends of respective vertical hollow supporting spindles or sleeves 61 which are journalled in the outer end portions of the respective swing arms 47. As shown more particularly in FIG. 11, each of the holders 46 comprises a stationary lower or anvil jaw 62 fastened on the respective hollow spindle 61, and a cooperating pair of side-by-side pivoted upper jaws 63 for independently clamping, against the stationary lower jaw 62, the two spud wires 3 which are to be held by each holder 46. The upper jaws 63 of each holder are pivoted at their back ends on the stationary lower jaw 62, by means of pivot pin 64, for pivotal movement in vertical planes to open and close the jaws, and they are actuated by vertical movement of an operating rod 65 slidable within and extending completely through the respective supporting spindle 61, the operating rod 65 being connected to the two upper jaws 63 through a cross bar 66 which is pivotally mounted on the upper end of the operating rod 65 by means of pivot pin 67. The pivotal mounting of the cross bar 66 on the operating rod 65 allows the pivoted jaws 63 to close independently of one another on the respective spud wires 3 and clamp them firmly against the stationary lower jaw 62 irrespective of any difference in their wire sizes. The operating rod 65 is continuously spring-urged in a downward direction, to thereby yieldingly hold the upper jaws 62 in normally closed position, by the force of a compression coil spring 68 which is fitted over the lower portion of the operating rod 65 and is compressed between the underside of the respective swing arm 47 and the upper side of an operating arm 69 fastened on the lower end of the operating rod.

Each of the wire holders 46 is provided with holder positioning or actuating means 70 (FIG. 8) for selectively holding the wire holders in one or the other of two rotative positions, i.e., a spud wire loading position as shown in FIGS. 3 and 3a wherein the jaws 62, 63 of the holder face radially outward of the turret 10 so as to be in position to permit the spud wires 3 to be loaded into and supported by the holders in postiions extending radially outward of the turret and transversely to the glass rod 2 held in the chuck 19, and a 90° horizontally inward rotated wire-inserting position as shown in FIGS. 4 and 4a wherein the jaws 62, 63 of the two holders 46 on each head face toward one another so that the spud wires 3 carried thereby extend approximately tangentially to the circular path of travel of the head and are approximately aligned lengthwise with the glass rod 2 in the associated chuck 19, with their projecting free ends disposed opposite and facing toward the opposite ends of the glass rod. The holder positioning means 70 for the wire holders 46 are in the form of over-center spring holding means comprising a tension coil spring 71 connected at one end to the respective holder operating arm 69 on the spindle 61 and at its other end to a spring post 72 which depends from the respective swing arm 47 and is located on the opposite side of the axis of rotation of the holder pivot spindle 61 from the point of connection of the spring 71 to the operating arm 69. With this arrangement, as soon as the center axis of the coil spring 71 is shifted the least amount to one side or the other of the vertical axis of rotation of the holder pivot spindle 61, by swinging movement of the operating arm 69 fastened thereon, the tension of the coil spring 71 will then act to further swing the operating arm 69 to that particular side of its pivot axis and thus rotate the holder spindle 61 and associated holder 46 into either their said wire loading or wire inserting rotative position, as respectively determined by the engagement of a stop pin 73 on the operating arm 69 with the spring post 72, or by the engagement of the stationary lower jaw 62 of the holder 46 with a stop pin 74 on the swing arm 47. The operating arm 69 for each holder 46 carries a roller 75 at its outer end for engagement with cooperating cam tracks of the apparatus, as hereinafter described, in order to effect the positive rotation of the holders 46 from one to the other of their said rotative positions.

In the operation of the apparatus according to the invention, the glass rods 2 are individually loaded into the opened jaws 20, 21 of the chuck 19 on the heads 11 during the dwell of each head at the first or glass rod loading station A of the apparatus. The jaws 20, 21 of the chuck 19 are held in their normally open position by the spring-loaded actuating rod 28 at the time the heads 11 first arrive at the said station A, and they are held in their open position during the first part of the dwell of each head 11 at that station to permit the loading of the glass rod 2 into the said jaws. During the last part of the dwell of each head 11 at the glass rod loading station A, the jaws 20, 21 are closed, to grip the glass rod 2 firmly therebetween, by upward pressure of a vertically reciprocable push rod 76 (FIG. 12) against the roller 40 on the lower end of actuating rod 28. The push rod 76 is located below the head 11 at said station A and it is actuated by a generally horizontally disposed rocker arm 77 pivoted on a rocker shaft 77'. One end of the rocker arm 77 is pivotally connected to the push rod 76 and its other end carries a roller 78 engaged with the cam track of a face cam 79 mounted on the main drive shaft 14 of the apparatus. The cam 79, acting through the rocker arm 77, operates during the last part of the dwell of each head 11 at station A to raise the push rod 76 to engage and lift up the spring-loaded actuating rod 28 so as to yieldingly close the chuck jaws 62, 63 against the glass rod 2. During the last part of the upward movement of the actuating rod 28, i.e., after the rod has been raised a sufficient distance to close the jaws 20, 21 firmly against the glass rod 2 positioned therebetween, the collar 43 on the actuating rod 28 clears the locking shoulder 42 on the spring-loaded latch 41, thus permitting the latch to be pivoted by its operating spring 44 so as to catch its locking shoulder 42 beneath the collar 43 and thus hold the actuating rod 28 in its raised jaw-closing position until such time during the ensuing travel of the heads 11 around the machine (i.e., during their index from stations M to N) when the latch 41 is disengaged from the collar 43. The glass rods 2 may be fed into the heads 11 by hand, but are preferably fed by a conventional type automatic feeding means, not shown herein.

During the time the heads 11 are positioned at the first or glass rod feeding station A and continuing throughout the ensuing travel of the heads through the first few stations of the machine, i.e., through station I, the wire holders 46 of each head 11 are held by the holder positioning means 70 in their wire-loading oriented position in which their wire-holding jaws 62, 63 face radially outward of the turret 10, as shown in FIGS. 3 and 7. From station A, the heads 11 are then successively indexed by the turret 10 to station B, where a conventional type detecting means (not shown) may be provided for the purpose of detecting the presence or absence of a glass rod 2 in the head, and then through idle station C to the spud wire feeding station D where two spud wires 3 are automatically loaded into each of the two wire holders 46 of the head 11 by automatically operating wire-feeding mechanisms 80 located at said station. As shown more particularly in FIGS. 7 and 8, the spud wire feeding mechanism 80 comprises a pair of wire-carrying slides 81 which are disposed in positions to be respectively opposite the two wire holders 46 of each head 11 when stationed at the wire-feeding station D, and they are slidably mounted in respective guideways 82 formed in the top platform 83 of a stationary stand or frame 84 for horizontal reciprocating movement in directions generally radially of the turret 10 and toward and away from the respective holders 46 of the head 11 at station D. During the dwell of each head 11 at station D, the slides 81 are advanced toward the wire holders 46 to withdraw predetermined lengths of wire, corresponding to the lengths of the spud wires 3 to be loaded into the head, from continuous supplies 85 of wire wound on spools 86 (FIG. 1), and to advance and insert the free ends of the continuous wire supplies 85 into the opened jaws 62, 63 of the respective wire holders 46. In the particular case illustrated, each slide 81 is adapted to feed two supply wires 85 into a respective one of the two wire holders 46 on each head 11.

The supply spools 86 (four of which are provided in the particular case illustrated) are rotatably mounted on a support bracket (not shown) fastened on the stand 84, and the wire supply 85 from each spool is drawn over and rests on the top surfaces of the platform 83 and the respective slide 81 and passes through a pair of wedged roller-type wire clamps or catches 87 and 88 mounted, respectively, on the stationary platform 83 and on the slide 81. From the wire clamps 87 and 88, the two wire supplies 85 fed by each slide 81 then pass through respective guide passageways (not shown) in a wide guide block 89 on the front end of the respective slide 81, which passageways serve to guide the free ends of the wire supplies 85 into proper position within the open jaws 62, 63 of the respective wire holder 46. As shown in FIG. 10, each of the wedged roller-type wire clamps or catches 87, 88, which are of identical construction, comprises a roller 90 confined and freely floating within a pocket 91 formed in a roller block 92 mounted on the top surface of the stationary platform 83 or slide 81, as the case may be, and continuously spring-pressed backwardly, relative to the direction of advance of the wire supply 85, into a wedged position between the wire supply on which the roller 90 rides and a tapered top wall or wedge surface 93 of the roller pocket 91. The roller 90 of each wire clamp 87 or 88 is spring-pressed into its wedged position by the force applied to its periphery by one of the arms 94 of respective torsion springs 95 mounted on the stationary platform 83 or slide 81. On the advance stroke of each slide 81 toward the head 11 at station D, the two rollers 90 of the two wire clamps 88 on the slide become wedged in their respective roller pockets 91, by the combined action of the rearward frictional drag of the wires on the rollers and the force of the torsion spring arms 94 acting thereon, and thus clamp the respective wire supplies 85 tightly against the upper surface of the slide 81 so as to be advanced along therewith. At the same time, the two rollers 90 of the two wire clamps 87 on the stationary platform 83 are drawn out or released from their wedged wire-clamping position within their respective roller pockets 91 by the frictional force of the advancing wire supplies 85 which acts against the peripheries of the rollers 90 and overcomes the wedging force exerted thereon by the torsion spring arms 94. This unwedging of the rollers 90 of the fixed wire clamps 87 then causes them to release their grip or clamp on the wire supplies 85, thus permitting free advance movement of the wire supplies through the fixed wire clamps 87 by the advance stroke of the slides 81 and the associated movable wire clamps 88 to their advanced position as determined by the engagement of the platform 83 with adjustable stop members 96 carried by the respective slides 81. As shown, the stop members 96 may be constituted by stop nuts threaded onto screw-threaded posts fastened to and extending from the back ends of the respective slides 81. On the return stroke of each slide 81 to pick up the required length of the wire supplies 85 to form the spud wires 3 that are to be inserted in the next head 11 to be positioned at station D, the wedge rollers 90 of the wire clamps 87, 88 for each wire supply 85 then operate in the reverse manner from that described above for the advance stroke of the slides 81. Thus, the roller 90 of the wire clamp 87 in such case becomes wedged against the respective wire supply 85 to thereby clamp the wire tightly against the stationary platform 83 so as to be immovably held in place, while the roller 90 on the other wire clamp 88 becomes unwedged so as to release the wire supply 85 to permit its free passage through the said clamp 88 as the respective slide 81 and clamp 88 are moved backwardly in the guideway 82.

Figure 13:
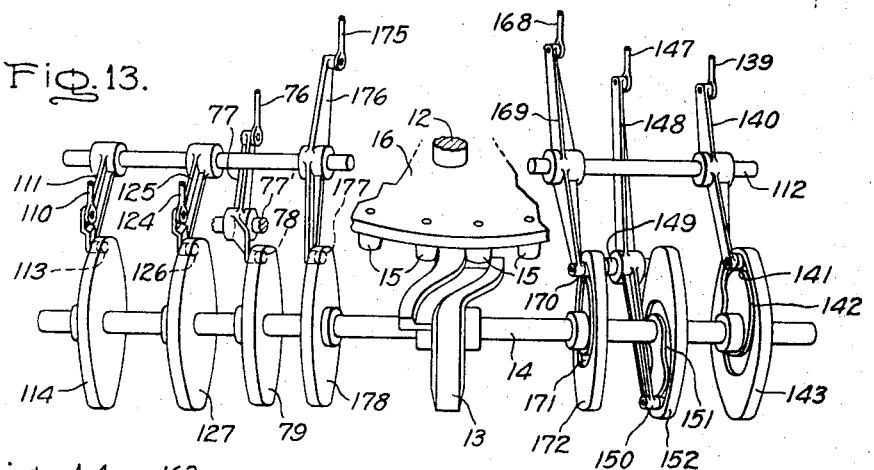

The wire-feeding slides 81 are normally held in their retracted position within their guideways 82 by respective tension coil springs 97 connected at their opposite ends to spring posts 98 and 99 on the slide 81 and platform 83, respectively. The advance stroke of the wire-feeding slides 81, to effect the feeding and insertion of the free ends of the wire supplies 85 into the opened chuck jaws 62, 63 of the wire holders 46 on the head 11 at station D, is imparted to the slides 81 by suitable actuating means 100 (FIG. 8) which may comprise a pair of generally vertically extending throw arms 101 fastened at one end on a horizontal pivot shaft 102 mounted on the support stand 84 and pivotally connected at their other ends to the respective slides 81 through a pin 103 on the slide which rides in a slot 104 in the respective throw arm 101. The throw arms 101 and pivot shaft 102 are rotated, to effect the forward and backward sliding movement of the slides 81, by the pivotal movement of a lever 105 fastened on the shaft 102 and a pair of generally vertically extending thrust arms 106 (one for each throw arm 101) which are also fastened on the shaft 102 and transmit the pivotal movement of the lever 105 to the respective throw arms 101 in one direction (i.e., in the direction to advance the slides 81) through a compression coil spring 107 and in the other or return direction by the engagement of the thrust arms 106 with adjustable stops 108 carried by the throw arms 101. The lever 105 extends generally horizontally and is pivotally connected near its swinging end to the upper end of a vertical operating rod 110 which is pivotally connected at its lower end to a generally horizontally extending cam follower arm 111 (FIG. 13). The follower arm 111 is pivoted at one end on a rocker arm shaft 112 and carries at its other end a cam follower roller 113 which rides in the cam track of a face cam 114 fastened on the main drive shaft 14 of the apparatus.

Upon completion of the advance movement of the slides 81 to feed the free ends of the wire supplies 85 into the wire holders 46 of the head 11 positioned at station D, the jaws 62, 63 of the wire holders 46 are closed to tightly clamp the free ends of the wire supplies 85 in place in the holders, whereupon the wire supplies are then severed, at the required distance back from their clamped ends, to thereby form the spud wires 3 projecting from the holders 46. The wire severing mechanism comprises a pair of disc-shaped cutter knives 115 (one for each pair of wire supplies 85 carried by the respective slides 81) rotatively mounted on respective pivot arms 116 for rotatable adjustment thereon. The pivot arms 116 are pivotally mounted at one end on the upper sides of the respective slides 81, on respective pivot pins 117, for pivotal movement in vertical planes normal to the wire supplies 85 carried by the respective slides 81 so as to swing the cutting edges of the knives 116 across the front end face of the respective wire guide block 89 and across the wire guiding passageways therein to thereby sever the wire supplies 85 projecting therefrom. The pivot arms 116 are actuated by a vertically extending actuating rod 118 pivotally connected at its upper end to the other or swinging ends of both pivot arms 116. The actuating rod 118 is pivotally connected at its lower end to the horizontal lever 105 of the slide actuating mechanism 100 through a pin and slot type lost motion connection, the lever 105 carrying at its outer end a pivot pin 119 which slides in a vertical slot 120 in the actuating rod 118. The pivot arms 116 and the cutter knives 115 carried thereby are normally spring-held in their raised inoperative position by the force of a pair of tension coil springs 121 (only one of which is shown in FIG. 8) which are connected at their opposite ends to spring posts on the stationary platform 83 and actuating rod 118, respectively. The pin 119 and slot 120 lost motion connection between the lever 105 and actuating rod 118 allows the slides 81 to move to their fully advanced wire-inserting position, and the jaws 62, 63 of the wire holders 46 to first clamp the free ends of the wire supplies 85, before the wire cutters or knives 115 are actuated to sever the wire supplies 85. This is so because the pin 119 on lever 105, throughout the entire travel of the slides 81 to their fully advanced position, merely rides freely downwardly through the slot 120 in the actuating rod 118 without engaging the lower end thereof so as to move the actuating rod 118 downwardly. It is only after the slides 81 reach their fully advanced wire-inserting position that a slight additional pivotal movement or overtravel of the lever 105, as permitted by the compressibility of the springs 107 between the thrust arms 106 and throw arms 101, causes the pin 119 to engage the lower end of the slot 120 in the cutter knife actuating rod 118 and force the latter downwardly so as to pivot the cutter support arms 116 and thus actuate the cutter knives 115 to effect the severing of the wire supplies 85.

The opening and closing of the jaws 62, 63 of the wire holders 46 of each head 11 during the interval they are positioned at station D, to permit the insertion and clamping of the free ends of the wire supplies 85 therein, is effected by a pair of upstanding posts 122 (FIG. 12) which are located directly below the respective holder operating rods 65 of the heads, when at said station, in position to engage, when raised, the lower ends of the respective operating rods 65 and lift them so as to open the holder jaws 62, 63. As shown in FIG. 12, the posts 122 are unitarily interconnected by a cross arm 123 fastened to the upper end of a vertically reciprocable lift rod 124 the lower end of which is pivotally connected to a cam follower arm 125 (FIG. 13) pivotally mounted at one end on the rocker shaft 112. The other end of the follower arm 125 is provided with a roller 126 which rides in the cam track of a face cam 127 fastened on the main drive shaft 14 of the apparatus. The cam 127, acting through the follower arm 125, lift rod 124, cross bar 123 and the posts 122, operates during the first portion of the dwell of each head 11 at station D to raise the operating rods 65 of each of the wire holders 46 so as to open the holder jaws 62, 63 to permit insertion thereinto of the free ends of the wire supplies 85 by the advance movement of the slides 81, and to then lower the posts 122 to disengage them from the operating rods 65 during the latter portion of the dwell of each head 11 at station D to permit the spring-loaded jaw operating rods 65 to close the holder jaws 62, 63 to clamp the wire supplies 85 tightly therein before the cutter knives 115 are operated to sever the wire supplies 85 to form the spud wires 3.

From the spud wire feeding station D, the heads 11 are then advanced by the turret 10 through idle stations E and F, at one or more of which spud wire detector mechanism may be provided if desired, and thence through a series of successive heating stations G to L, inclusive, where gas fires from burners 128 (FIG. 1) at each of said stations are directed against the opposite ends of the glass rods 2 held in the chucks 19 of the heads to soften the said ends of the glass rods sufficiently to permit insertion of the spud wires 3 thereinto. During the index of each head 11 from station I to J, the wire holders 46 are rotated from their wire-loading position in which they have been oriented up to this point as shown in FIGS. 3 and 3a, to their 90° inwardly rotated wire-inserting position as shown in FIGS. 4 and 4a wherein the spud wires 3 held in the respective holders 46 are longitudinally aligned with and face toward the respective adjacent ends of the glass rod 2 held in the chuck 19 of the head. The rotation of the wire holders 46 to their said wire-inserting oriented position is effected by the engagement of the rollers 75 on the operating arms 69 of the holders 46 with a stationary cam track 130, located beneath the turret, during the index of the heads 11 from stations I to J. The cam track 130 forces the cam follower rollers 75 inwardly of the turret 10 a sufficient distance to rotate the holders 46 to their wire-inserting position and at the same time shift the holder positioning springs 71 to the opposite side of the axis of rotation of the holder spindle 61 so that the force of these springs is then exerted on the respective operating arms 69 in a manner to thereafter hold the holders 46 in their 90° rotated wire-inserting position throughout the remainder of the travel of the heads 11 around the machine to the last station X.

During the subsequent index of the heads 11 from stations L to M, the wedge cam 54 of each head is rotated out from between the follower rollers 55 on the holder-carrying swing arms 47 of the head to cause the said arms 47 to be swung toward one another, by the action of the coil spring 50, to bodily displace the associated wire holders 46 toward the respective softened ends of the glass rod 2 in the chuck 19 so as to thrust and insert the projecting free ends of the spud wires 3 carried by the holders into the softened ends of the glass rod. The rotation of the wedge cam 54 out from between the rollers 55 to permit the swinging movement of the swing arms 47 is effected by the engagement of the follower roller 58 on the cam operating arm 57 with a stationary cam track 131 (FIG. 12) located below the turret 10, during the index of the heads from stations L to M.

Following the insertion of the spud wires 3 into the softened ends of the glass rod 2 between stations L and M, the glass is allowed to cool and harden so that the spud wires 3 become immovably embedded therein. At station M, however, the glass at the ends of the glass rod may be annealed, if desired, by directing gas flames thereagainst from gas burners (not shown) located at said station. While the ends of the glass rod 2 are cooling to their hardened state, the swing arms 47 and associated wire holders 46 are continuously maintained in their advanced wire-inserting position by the force of the spring 50 acting to close the arms 47 as well as by the cam track 131 which, for that purpose, is extended through the next few stations, e.g., to station O as shown in FIG. 12, so as to positively hold the wedge cam 54 in its inoperative rotated position throughout the travel of the heads 11 to that station. By the time the heads 11 reach station O, the glass at the ends of the glass rods 2 has hardened sufficiently to prevent any withdrawal of the inserted spud wires 3 therefrom. Consequently, the continuing firm clamping of the embedded spud wires 3 by the wire holders 46 on the swing arms 47, coupled with the nonwithdrawability of the embedded spud wires 3 from the hardened glass rod 2, serves to thereafter hold and maintain the swing arms 47 in their advanced wire-inserting position so that there is no need for extending the cam track 131 any distance beyond station O in order to positively maintain the wedge cam 54 in its inoperative rotated position. Besides, the force exerted by the spring 50 on the swing arms 47 tending to hold them in their advanced wire-inserting position is greater than, and thus overcomes, the force exerted by the spring 59 on the wedge cam 54 tending to rotate it back to its wedging position between the rollers 55 to separate the swing arms 47.

Since the glass at the ends of the glass rods 2 is sufficiently hardened, even by the time the heads 11 arrive at station M, to permit the glass rods 2 to be supported thereafter solely by their embedded spud wires 3, i.e., without the need of the added support afforded by the chuck 19, the jaws 20, 21 of the chuck 19 are therefore opened at such time in accordance with the invention. This opening of the chucks 19, which in the particular case illustrated occurs during the index of the heads 11 from stations M to N, thus completely exposes the glass rods 2 along their full length and around their entire circumferential extent to permit ready access to all regions thereof for subsequent insertion of wire supports into the side of the glass rod 2 at any point therealong or therearound. The opening of the glass rod holding jaws 20, 21 at this time is effected by the engagement of the roller 45 on the locking latch 41 with a stationary cam track 132 (FIG. 12) of the apparatus during the travel of the heads 11 from stations M to N. The latch 41 is thereby pivoted to disengage its locking shoulder 42 from the collar 43 on the spring-loaded actuating rod 28, thus freeing the said rod for downward movement by its operating spring 38 to effect the opening of the jaws 20, 21.

Beginning at station N, and continuing at the next succeeding stations of the apparatus up to and including station P, the outwardly facing side regions of the glass rods 2, now supported solely by their embedded spud wires 3 held in the wire holders 46 of the heads 11, are heated throughout the full length of the glass rods by flat gas fires directed thereagainst from gas burners 133 located at said stations to thereby soften the said side regions of the glass rods sufficiently to permit the insertion thereinto of one or more support wires 4 at the next succeeding station Q. The insertion of the support wires (four in the particular case illustrated) may be performed by any conventional type inserting mechanism 135 adapted to hold the wires 4 side-by-side in a single horizontal plane and advance them toward the glass rod 2 so as to insert their projecting free ends in the softened side region of the glass rod during the dwell of each head 11 at station Q. The particular inserting mechanism 135 illustrated may be similar to that disclosed and claimed in U.S. Patent 3,046,634, Kolda et al., and comprising, in general, a horizontally reciprocable slide 136 (FIGS. 1 and 5a) adapted to hold the four support wires 4 in position for insertion in the glass rod 2, the support wires 4 being clamped against the upper side of the slide 136 by the light pressure of respective individual spring fingers 137 of a leaf spring mounted on the slide. During the dwell of each head 11 at the support wire inserting station Q, the slide 136 is reciprocated to first advance it to its forward wire-inserting position and then, at the end of the dwell of the head 11 at said station, by which time the glass of the rod 2 is sufficiently hardened to prevent withdrawal of the inserted support wires 4, to move the slide 136 back to its retracted position during which movement the support wires 4, now firmly embedded in the glass rod 2, are simply pulled out from beneath the leaf spring fingers 137 on the slide. The slide 136 is reciprocated in proper time relation to the dwell of the heads 11 at station Q by operating means comprising a bell crank lever 138 pivoted on a stationary frame portion of the machine and having one arm pivotally connected by a pin and slot connection to the slide 136 and the other arm pivotally connected to the upper end of a vertical actuating rod 139. The actuating rod 139 is pivotally connected at its lower end to one end of a rocker arm 140 (FIG. 13) which is pivotally mounted on the rocker shaft 112 and is provided at its other end with a roller 141 riding in the cam track 142 of a face cam 143 fastened on the main drive shaft 14 of the apparatus. The wire-inserting slide 136 may be one of a number of such slides mounted around the periphery of a turret 144 (FIG. 1) which, after loading of the four support wires 4 into the slides, then indexes the wire-carrying slides successively into position opposite the head 11 at station Q in readiness for insertion of the support wires into the glass rod 2 held in the head.

Figure 14:
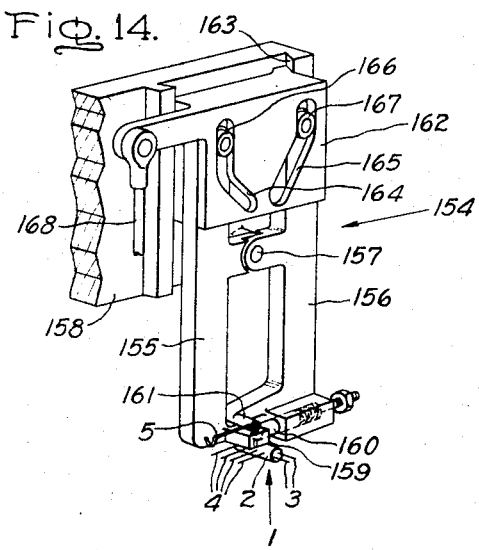

Where, as in the particular case illustrated, an additional or top wire support 5 is also to be inserted in the top side of the glass rod 2 of the insulating bridge 1, the tops of the glass rods 2 held in the heads 11 are in that case heated and locally softened at station Q, by a concentrated gas fire directed downwardly thereagainst from a gas burner (not shown) located at that station. The top support wire 5 is then inserted into the softened top region of the glass rod 2 in the head 11 during the dwell thereof at the next station R. The insertion of the top support wire 5 may be performed by any suitable mechanism 145 (FIG. 1) located at station R such as, for example, that described and claimed in U.S. Patent 2,199,852, Iden, and comprising, in general, a vertically movable holder 146 (FIGS. 6 and 6a) overlying the glass rod 2 in the head 11 at said station and carrying the top support wire 5 in position for insertion into the glass rod. The holder 146 is moved vertically, to effect the insertion of the top support wire 5 into the glass rod 2, by a vertically reciprocable actuating rod 147 (FIG. 2) which is connected at its lower end to one end of a rocker arm 148 (FIG. 13) pivotally mounted on a rocker shaft 149 and carrying a roller 150 at its other end which rides in a cam track 151 in a cam 152 fastened on the main drive shaft 14 of the apparatus. As shown in FIG. 6a, the top support wires 5 may be formed with hooks 6 at their outer ends prior to their insertion into the glass rods 2 of the insulating bridges 1.

Where the top support wire 5 is to be bent or reshaped after its insertion in the glass rod 2, as where it is to be bent to extend more or less parallel to the other support wires 4 inserted in the glass rod, the bending of the top support wire 5 may in such case be performed at the next station S by suitable wire bending mechanism 154 located thereat. As shown in FIG. 14, the bending mechanism 154 may comprise, in general, a pair of generally vertically extending pivot arms 155 and 156 pivotally mounted on a pivot pin 157 extending from a support bracket 158 on the machine frame to swing in a vertical plane. One of the pivot arms 155 carries at its lower end an anvil die 159 against the vertical end face of which the top support wire 5 is first clamped by a spring-loaded clamping slide 160 on the lower end of the other pivot arm 156, and over the top side of which the wire 5 is then bent by a pin-shaped bending die 161 on the lower end of the said other pivot arm 156 during the overtravel thereof, when the two arms 155, 156 are pivoted to their operative wire-bending position shown in FIG. 14. The two pivot arms 155 and 156 are operated by a vertically movable slide type cam 162 which is vertically reciprocable on the bracket 158 within a guideway 163 therein and is provided with respective cam slots 164 and 165 in which ride a pair of rollers 166, 167 which are mounted on the upper ends of the respective pivot arms 155, 156. The slide cam 162 is vertically reciprocated in proper time relation to the dwell of each head 11 at station R to pivot the arms 155, 156 to their operative wire-bending position, and then return them to their inoperative position, by a vertical actuating rod 168 pivotally connected at its upper end to the slide cam 162 and at its lower end to one end of a rocker arm 169 (FIG. 13) pivoted on the rocker shaft 112. The other end of the rocker arm 169 carries a roller 170 which rides in the cam track 171 of a face cam 172 mounted on the main drive shaft 14 of the apparatus.

From the top support wire bending station S, the heads 11 are then indexed through a series of stations T to V which, as shown, may be idle stations or at which various additional support wire forming mechanisms (not shown) may be provided for bending or reshaping additional support wires that may, if desired, be inserted in the glass rods 2 of the insulating bridges 1 at station S, or for forming the hooks 6 on either the top support wire 5 or on such other support wires, including the wire supports 4.

At the next station W of the apparatus, the completely formed insulating bridges 1 are unloaded from the heads 11. This is accomplished by opening the wire holders 46 in which the insulating bridges 1 are held. The released insulating bridges 1 may be simply allowed to drop out of the heads 11 and suitably guided, as by means of an air blast, into a delivery chute or they may be removed from the opened wire holders 46 by an automatic unloading mechanism such as by a vacuum pick-up arm (not shown). The opening of the wire holders 46 to release the completed insulating bridges 1 is effected by a pair of upstanding posts 173 (FIG. 12) which are located directly below the respective operating rods 65 of the wire holders 46, when the heads 11 are at the unloading station W, in position to engage, when raised, the lower ends of the respective operating rods and lift them so as to open the holder jaws 63. As shown in FIG. 12, the posts 173 are unitarily interconnected by a cross arm 174 fastened to the upper end of a vertically reciprocable lift rod 175 the lower end of which is pivotally connected to a rocker arm 176 (FIG. 13) pivotally mounted on the rocker shaft 112. The other end of the rocker arm 176 is provided with a roller 177 which rides in the cam track of a face cam 178 fastened on the main drive shaft 14 of the apparatus.

From the unloading station W, the heads 11 are then indexed to idle station X and thence to the first or glass rod feeding station A for the start of another cycle of operation. During the travel of the heads 11 from station X to station A, the spud wire holders 46 of the heads are rotated back to their initial or wire-loading oriented position as shown in FIGS. 3 and 3a wherein the jaws 62, 63 thereof face radially outward of the turret 10 in readiness for the insertion thereinto of the spud wires 3 at the subsequent spud wire feeding station D. The rotational movement of the wire holders 46 back to their said wire-loading position is effected by the engagement of the rollers 75 on the spring-loaded operating arms 69 with a stationary cam track 179 located below the turret 10. The cam track 179 operates to swing the rollers 75 and associated operating arms 69 outwardly of the turret, during index of the heads 11 from stations X to A, so as to rotate the wire holders 46 to their said wire-loading position and at the same time shift the tension coil springs 71 over, i.e., to the other side of, the center of rotation of the holder spindles 61 so that the force of these springs is then exerted on the respective operating arms 69 in a manner to hold the said arms and the associated wire holders 46 in their said wire-loading position.

Also during the index of the heads 11 from stations X to A, the swing arms 47 are returned to their retracted or separated position by the rotation of the wedge cam 54 to again locate or wedge its high or wide portion between the rollers 55 on the swing arms 47, in which position the wedge cam 54 is then held by the force of the tension coil spring 59 acting on the operating arm 57 for the cam. The rotation of the wedge cam 54 back to its wedging position between the rollers 55 on the swing arms 47 is effected by the engagement of the roller 58 on the cam operating arm 57 with a stationary cam track 180 located below the turret 10, during the index of the heads 11 to station A. The return of the swing arms 47 and associated wire holders 46 to their retracted or separated position as described above and the rotation of the wire holders 46 back to their initial wire-loading position, during the index of the heads 11 from stations X to A, thus completes the full cycle of operation of the apparatus comprising the invention and places the heads 11 and all the component operating parts thereof in readiness for the start of another cycle of operation beginning at station A.

From the above description, it will be apparent that the method and apparatus according to the invention affords a very satisfactory means and procedure for automatically manufacturing insulating bridges of the general type referred to herein economically and at a rapid rate, and with a minimum of difficulty. In addition, the particular manner of supporting the glass rod 2 by its embedded spud wires 3 so as to leave the glass rod completely exposed for the insertion of wire supports into its side regions, imparts a considerable degree of flexibility to the apparatus such as to enable the manufacture thereon of a wide variety of insulating bridges 1 having, for example, various numbers, locations and shapes of wire supports embedded in the sides of the glass rods.

Although a preferred embodiment of my invention has been disclosed, it will be understood that the invention is not to be limited to the specific construction and arrangement of parts shown, but that they may be widely modified within the spirit and scope of my invention as defined by the appended claims.

What I claim as new and desire to secure by Letters Patent of the United States is:

1. The method of making an insulating bridge member of the type comprising a length of glass rod having spud wires embedded in and projecting endwise from its opposite ends and at least one support wire embedded in and projecting from its side, which method comprises the steps of supporting the glass rod at a region intermediate its ends, heating and softening the opposite ends of the glass rod, inserting the said spud wires endwise into the softened opposite ends of the glass rod, releasing the support of the glass rod at its intermediate region to completely expose the said region and supporting the glass rod instead solely by the said spud wires embedded in its opposite ends, and then heating and softening an intermediate side region of the glass rod and inserting a support wire thereinto while the rod is thus supported solely by the said spud wires.

2. The method of making an insulating bridge member of the type comprising a length of glass rod having spud wires embedded in and projecting endwise from its opposite ends and at least one support wire embedded in and projecting from its side, which method comprises the steps of supporting the glass rod at a region intermediate its ends heating and softening the opposite ends of the glass rod, inserting the said spud wires endwise into the softened opposite ends of the glass rod, releasing the support of the glass rod at its intermediate region to completely expose the said region and supporting the glass rod instead solely by the said spud wires embedded in its opposite ends, and then successively heating and softening intermediate regions of the glass rod at spaced points therearound and inserting support wires thereinto while the glass rod is supported solely by the said spud wires.

3. In apparatus for making insulating bridge members of the class described, the combination of a work-supporting head comprising rod holding means for gripping and supporting a length of glass rod at a region intermediate its ends, a pair of wire-supporting holders disposed on opposite sides of said rod holding means, in positions opposite the ends of the glass rod held therein, to grip and firmly hold a spud wire at one end with its other end projecting free the wire holders of each head being mounted thereon for bodily movement toward and away from each other and for rotation between a wire-loading position in which the said spud wires are loaded into and supported by the holders in positions extending transversely to the glass rod held in said rod holding means and a wire-inserting position in which the spud wires are approximately aligned lengthwise with said glass rod with their projecting free ends facing toward the opposite ends thereof, means located adjacent said rod holding means for heating and softening the end portions of the glass rod supported therein, actuating means for rotating the said wire holders from their said wire-loading position to their said wire-inserting position, and operating means for bodily displacing the said wire holders toward one another to thrust the projecting free ends of the spud wires carried thereby into the softened ends of the glass rod.

4. In apparatus of the character specified in claim 3, the combination therewith of additional heating means for heating and softening an intermediate side region of the glass rod supported at its ends by the inserted spud wires held in said holders, and a support wire inserting means disposed adjacent said rod holding means and comprising a holder member movable toward and away from said rod holding means to hold a support wire at one end with its other end projecting from the holder member toward the said softened intermediate side region of the glass rod in said rod holding means, and means for actuating the said holder member to carry it toward the glass rod to thrust and embed the projecting free end of the support wire carried thereby into the softened intermediate side region of the glass rod held by the said holders.

5. In a machine for making insulating bridge members of the class described, the combination of a movable carrier, a plurality of work-supporting heads mounted on and equally spaced apart along said carrier, means for intermittently indexing said carrier to advance the said heads step-by-step to a plurality of successive work stations, each of said heads comprising chuck means for supporting a length of glass rod lengthwise of the path of travel of the heads and a pair of wire-supporting holders disposed on opposite sides of said chuck means to hold spud wires at one end with their other ends projecting free, the wire holders of each head being mounted thereon for bodily movement toward and away from each other and for rotation between a wire-loading position in which the spud wires are loaded into and supported by the holders in positions extending transversely to the path of travel of the heads and a wire-inserting position in which the spud wires are approximately aligned lengthwise with the glass rod in the associated chuck means with their projecting free ends facing toward the opposite ends of the glass rod, heating means at a series of said work stations for heating and softening the end portions of the glass rods carried by said chucks, actuating means located along the path of travel of the heads for rotating said holders from their said wire-loading position to their said wire-inserting position, and operating means located along the path of travel of the heads beyond said heating stations for bodily displacing the said holders toward one another while in their said wire-inserting position to thrust the projecting free ends of the spud wires carried thereby into the softened ends of the glass rod.

6. In a machine of the character specified in claim 5, the combination therewith of means located along the further path of travel of the heads beyond the said wire-inserting position thereof for opening the said chuck means to thereby completely expose the glass rod previously supported therein and leave it thereafter supported in the head solely by the said wire-supporting holders, additional heating means at a series of said work stations along the said further path of travel of the heads for heating and softening an intermediate side region of the glass rod supported at its ends by the inserted spud wires held in said holders, a support wire inserting means disposed at one of said work stations beyond said additional heating means and comprising a holder member movable toward and away from the glass rod supported in the head at said one work station to hold a support wire at one end with its other end projecting toward the said softened intermediate region of the glass rod in the head, and means for actuating the said holder member to carry it toward the glass rod to thrust and embed the projecting free end of the support wire carried thereby into the softened intermediate side region of the glass rod supported in the head at said one work station.

7. In a machine for making insulating bridge members of the class described, the combination of a horizontally movable carrier, a plurality of work-supporting heads mounted on and equally spaced apart along said carrier, means for intermittently indexing said carrier to advance the said heads step-by-step along a horizontal path of travel to a plurality of successive work stations, each of said heads comprising chuck means for supporting a length of glass rod horizontally in a position lengthwise of the path of travel of the heads and a pair of spaced wire-supporting holders disposed on opposite sides of said chuck means so as to be opposite the ends of the glass rod carried thereby, said holders including means to hold spud wires at one end with their other end projecting free, the wire holders of each head being mounted thereon for bodily movement toward and away from each other and for rotation about vertical axes between a wire-loading position in which the spud wires are loaded into and supported by the holders in positions extending transversely to the path of travel of the heads and a wire-inserting position in which the spud wires are approximately aligned lengthwise with the glass rod in the associated chuck means with their projecting free ends facing toward the opposite ends of the glass rod, spud wire feeding means at one of said work stations for loading the said spud wires into the said wire-supporting holders during the interval they are located at said station in their said wire-loading position, means for actuating said wire feeding means in timed relation to the dwell of the said heads at said wire-loading station, means at a series of subsequent ones of said work stations for heating and softening the end portions of the glass rods carried by such chuck means, actuating means located along the further path of travel of the heads following the loading of the spud wires thereinto for rotating said holders from their said wire-loading position to their said wire-inserting position, and operating means located along the further path of travel of the heads beyond said heating stations for bodily displacing the said holders toward one another while in their wire-inserting position to thrust the projecting free ends of the spud wires carried thereby into the softened ends of the glass rod.

8. In a machine for making insulating bridge members of the class described, the combination of a horizontal turret, a plurality of work-supporting heads mounted on said turret in equally spaced apart relation about the periphery thereof, means for intermittently indexing said turret to advance the said heads step-by-step to a plurality of successive work stations, each of said heads comprising a chuck for supporting a length of glass rod horizontally in a position longitudinally aligned with the path of travel of the head and a pair of spaced wire-supporting holders disposed on opposite sides of said chuck, opposite the ends of the glass rod carried thereby, to hold spud wires at one end with their other ends projecting free, the wire holders of each head being bodily movable thereon toward and away from each other and rotatable thereon about respective axes transverse to the path of travel of the head, chuck operating means on each of said heads for opening and closing the respective chuck thereon, said operating means including means to hold the chuck in a normal open position, actuating means located along the path of travel of the heads to engage and operate the said operating means thereon so as to close the said chucks, spud wire feeding means at one of said stations, means to operate said spud wire feeding means in timed relation to the index movements of the turret to load the spud wires transversely of the path of travel of the heads into the said holders thereof, means at a series of following stations for heating and softening the end portions of the glass rods carried by said chucks, holder positioning means on each of said heads for selectively holding the said holders in either its wire-loading position or in a rotated wire-inserting position in which the spud wires carried thereby extend approximately tangentially to the path of travel of the heads so as to be approximately aligned lengthwise with the glass rod in the associated chuck, means located along the path of travel of the heads following the loading of the spud wires thereinto for actuating said holder positioning means to cause it to rotate the holders to their said wire-inserting position, holder displacing means on each of said heads to hold the said holders of each head in a retracted position relative to one another so that the spud wires carried thereby are spaced from the ends of the glass rod in the associated chuck when the holders are in their said wire-inserting rotative position, means located along the further path of travel of the heads following the rotation of the holders thereof to their said wire-inserting position to engage and actuate the holder displacing means of each head so as to bodily move the holders thereon toward one another into an advanced position to thrust the spud wires carried thereby into the softened opposite ends of the glass rod in the associated chuck, and chuck opening means located along the further path of travel of the heads following the insertion of the spud wires into the glass rod to engage and actuate said chuck operating means so as to open the associated chuck.

9. In a machine for making insulating bridge members of the class described, the combination of a horizontal turret, a plurality of work-supporting heads mounted on said turret in equally spaced apart relation about the periphery thereof, means for intermittently indexing said turret to advance the said heads step-by-step to a plurality of successive work stations, each of said heads comprising a chuck including movable jaw means for supporting a length of glass rod horizontally in a position longitudinally aligned with the path of travel of the head and a pair of spaced wire-supporting holders disposed on opposite sides of said chuck opposite the ends of the glass rods carried in the chuck, said holders including means to hold spud wires at one end with the other ends projecting free, the wire holders of each head being mounted thereon for bodily movement toward and away from each other and for rotation about respective axes transverse to the path of travel of the head, jaw operating means on each of said heads connected to the said movable jaw means thereon to effect opening and closing thereof, said operating means including means to hold said jaw means in a normal open position, actuating means including a cam track extending along a portion of the path of travel of said heads between certain of said work stations and engaging said jaw operating means to cause it to close the said jaw means, spud wire feeding means at one of said stations for loading the said spud wires into the said wire-supporting holders in positions extending transversely to the path of travel of the heads, means for actuating said wire feeding means in timed relation to the dwell of the said heads at said one station, means at a series of subsequent ones of said stations for heating and softening the end portions of the glass rods carried by said chuck, actuating means including a first cam track located along the path of travel of the heads beyond the spud wire loading station and engageable with cooperating cam followers carried by the respective holders of each head to rotate the said holders from their wire-loading position to a wire-inserting position in which the spud wires carried thereby extend approximately tangentially to the circular path of travel of the heads so as to be approximately aligned lengthwise with the glass rod in the associated chuck with their projecting free ends facing toward the opposite ends of the glass rod, holder displacing means on each of said heads to hold the said holders of each head in a retracted position relative to one another so that the spud wires carried by the holders are spaced from the ends of the glass rod in said chuck when the holders are in their said wire-inserting rotative position, and a second cam track extending along the further path of travel of the heads following the rotation thereof to their said wire-inserting position and engageable with cam followers carried by the said holder displacing means of the heads to actuate said holder displacing means to bodily displace the holders of each head toward one another into an advanced position to thrust the spud wires carried thereby into the softened opposite ends of the glass rod in the associated chucks.

10. A machine of the character specified in claim 9 wherein the said actuating means includes means engageable with said jaw operating means at a subsequent one of said work stations following the said insertion of the spud wires into the glass rod to actuate said jaw operating means to open the said jaw means of each head.

11. In apparatus for making insulating bridge members of the class described, the combination of a work-supporting head comprising a support bracket, chuck means comprising a pair of jaws on said bracket for supporting a short length of glass rod therebetween, at least one of said jaws being movably mounted on said bracket toward and away from the other of said jaws, chuck operating means comprising an actuating rod connected to said movable jaw and reciprocable on said bracket to open and close the movable jaw, spring means normally urging said actuating rod in a direction to hold the said movable jaw in open position, a pair of spaced wire-supporting holders located on opposite sides of said chuck means opposite the ends of the glass rod carried thereby and rotatably mounted on said bracket for rotation between a wire-loading position in which the spud wires are loaded into and supported by the holders in positions extending transversely to the glass rod held in said chuck means and a wire-inserting position in which the spud wires are approximately aligned lengthwise with the said glass rod with their projecting free ends facing toward and contiguous the opposite ends of said rod, over-center spring holding means on said bracket connected to said holders to selectively hold them in either of their said wire-loading and wire-inserting positions, said holders being additionally mounted on said bracket for bodily movement toward and away from each other between retracted and advanced positions, and holder displacing means on said bracket for bodily moving the said holders from one to the other of the said retracted and advanced positions.

12. In apparatus of the character specified in claim 11, the combination therewith of a movable locking latch on said bracket engageable with the said actuating rod to lock it in place to hold the said movable jaw in its closed position.

13. In apparatus for making insulating bridge members of the class described, the combination of a work-supporting head comprising a support bracket, a chuck comprising movable jaws on said bracket for supporting a short length of glass rod therebetween, chuck operating means on said bracket connected to said movable jaws to open and close them, a pair of movable support members on said bracket, a pair of spaced wire-supporting holders on said support members located on opposite sides of said chuck means opposite the ends of the glass rod carried thereby and adapted to hold spud wires at one end with their other ends projecting free, said holders being rotatably mounted on said support members about respective axes extending transversely to the glass rod held in said chuck, holding means operatively connected to said holders to selectively hold them in either of two rotative positions on their respective support members comprising a wire-loading position in which the spud wires are loaded into and supported by the holders in positions extending transversely to the glass rod held in said chuck and a wire-inserting position in which the spud wires are approximately aligned lengthwise with the said glass rod with their projecting free ends facing toward the opposite ends of the glass rod, said support members being mounted on said support bracket for movement in directions to bodily displace the said holders toward and away from each other between retracted and advanced positions, and holder displacing means on said bracket coacting with said support members to selectively move the said members and the said holders thereon from one to the other of their said retracted and advanced positions.

14. Apparatus of the character specified in claim 13 wherein the said movable support members comprise a pair of swing arms pivoted on said support bracket about respective axes extending transversely to the glass rod carried by said chuck.

15. Apparatus of the character specified in claim 14 wherein the said holder displacing means comprises spring means connected to and normally urging the said pivoted swing arms and the said holders thereon toward each other to hold them in their said advanced position, and a movable cam on said support bracket engageable with the said support arms to pivot them in a direction to move the holders thereon away from each other into their said retracted position.

References Cited

UNITED STATES PATENTS

| | | | |
|---|---|---|---|
| 2,199,852 | 5/1940 | Iden | 65—139 X |
| 2,600,052 | 6/1952 | Gartner et al. | 65—139 X |
| 2,676,435 | 4/1954 | Gillman | 65—139 |
| 3,116,992 | 1/1964 | Greiner et al. | 65—139 X |

DONALL H. SYLVESTER, *Primary Examiner.*

R. L. LINDSAY, JR., *Assistant Examiner.*

U.S. Cl. X.R.

65—139, 154, 155, 278